United States Patent
Del Mercado et al.

[11] Patent Number: 5,918,661
[45] Date of Patent: Jul. 6, 1999

[54] PROCESS TO MANUFACTURE PORE-FREE CAST-ON-STRAP JOINTS FOR LEAD-ACID BATTERIES

[75] Inventors: Luis Francisco Vazquez Del Mercado, Monterrey; Gregorio Vargas-Gutierrez; Jorge Lopez-Cuevas, both of Saltillo, all of Mexico

[73] Assignee: Acumuladores Mexicanos, S.A. de C.V., Monterrey, Mexico

[21] Appl. No.: 08/941,531

[22] Filed: Sep. 30, 1997

[51] Int. Cl.⁶ .............................. B22D 19/01; B23K 1/20
[52] U.S. Cl. ...................... 164/102; 164/80; 228/201; 228/207
[58] Field of Search .................... 164/102, 80; 228/262, 228/207, 201, 58; 29/2; 429/158, 159, 160

[56] References Cited

U.S. PATENT DOCUMENTS 3,912,544 10/1975 Sabatino .................................. 164/102

Primary Examiner—Kuang Y. Lin
Attorney, Agent, or Firm—Harrison & Egbert

[57] ABSTRACT

A method for producing pore-free cast-on-strap joints for lead-acid batteries including the steps of cleaning a plurality of positive and negative plate lugs by a combined action of flux and ultrasonic vibration, water rinsing the plate lugs under ultrasonic vibration, and drying the plate lugs by gas blasting. The gas blasting occurs prior to the formation of the cast-on-strap joint. The cast-on-strap joint is formed by introducing the plate lugs into a molten lead-based strap alloy contained in a strap mold and solidifying the molten strap alloy in the strap mold.

3 Claims, 6 Drawing Sheets

PROCESS TO MANUFACTURE PORE-FREE CAST-ON-STRAP JOINTS FOR LEAD-ACID BATTERIES

TECHNICAL FIELD

The present invention relates generally to the manufacture of batteries. More particularly, the present invention relates to processes for the manufacture of cast-on-strap joints for lead-acid batteries.

BACKGROUND OF THE INVENTION

A lead-acid storage battery is a device which converts chemical energy into electrical energy. Electrical energy is produced by the chemical reactions taking place between a liquid electrolyte and the active material contained in the positive and negative plates immersed in it. The electrolyte is sulfuric acid ($H_2SO_4$). The active material is lead dioxide ($PbO_2$) for the positive plates, and sponge lead (Pb) for the negative plates. The chemical reactions start and electrical energy flows from the battery as soon as there is a circuit between the positive and negative terminals. The electrical current flows as electrons through the outside circuit and as charged ions in the electrolyte between the plates, inside the battery. During the process, the active material of both positive and negative plates combines with sulfuric acid forming lead sulfate ($PbSO_4$). At the positive plates, water is additionally formed, which reduces the concentration of acid in the electrolyte. Therefore, as the battery discharges, the negative and positive plates become more alike chemically and the acid becomes weaker, which reduces the voltage produced by the battery. However, the lead-acid storage battery is chemically reversible. A discharged battery can be recharged by passing an electrical current through it in the direction opposite to the direction of discharge. In this way, the active materials of the plates are restored to the charged state. The entire cycle can be repeated over and over again until plate deterioration or some other factor causes the battery to fail.

A complete conventional lead-acid battery assembly consists of the cell elements, intercell connectors, a container, a cover, vent plugs and terminal posts. The assembly resulting from placing one positive plate group and one negative plate group together, with separators, is known as a cell element. The components of a cell element are plate grids, active materials, separators and cast-on-strap joints. The main role of the grids, which are made of a lead alloy usually containing a small amount of antimony and/or other chemical elements, is to provide a supporting framework for the active material of the plates, as well as to conduct the current to and from the active materials. The separators are thin sheets of electrically insulating finely porous material, which are used to avoid the occurrence of short circuits by keeping apart the negative from the positive plates, while permitting the passage of charged ions of the electrolyte between the plates. Envelope separators can be used around the positive or negative plates. Usually these envelopes are closed on three sides and open at the top to allow the gases generated on the plates to escape. A cell element is formed by stacking together alternate negative and positive plates. The plates are introduced into envelope separators prior to the cell element construction. The lugs of the negative plates in the cell element are joined together by a cast-on-strap joint. The same is done to the lugs of the positive plates in the cell element. Any number or size of plates can be used in the cell element, depending on the desired battery performance. For instance, a greater quantity of plates or larger plates increase the total plate surface area per element, which increases the voltage during discharge at high rates. This is due to the fact that only the material on or near the plate surfaces take part in the fast chemical reactions which occur at fast discharge rates. The cast-on-strap joint of each group of plates is used to connect them in series with the plate groups of adjacent cells. This is done by connecting the cast-on-strap joint of the positive plates in a cell to the cast-on-strap joint of the negative plates of an adjacent cell, in such a way that the voltage of the battery equals the sum of the voltages of the individual cells. The voltage of a single cell is nominally 2 volts, regardless of the size or quantity of plates. Therefore, a 12-volt battery has six cells and a 6-volt battery has three cells.

The steps followed to manufacture a lead-acid battery are: plate grid casting and preparation of active material pastes; paste application to the plate grids; paste curing; cell element integration operations; plate lugs joining by cast-on-strap process; subsequent battery assembly processes; electrolyte addition to battery cells; electric formation of the battery and final assembly and testing.

At the beginning of the process, the plate groups are placed at the loading station of the machine, their lugs are turn downwards and the plates are vibrated to aligned them up. Then, the plates are moved to the next stage of the process, where the plate lugs are brushed by means of a rotating horizontal steel brush in order to eliminate lead oxide skins, active material paste, as well as any other surface contaminants present. Subsequently, a film of liquid flux, at room temperature, is applied to the freshly brushed surface of the plate lugs, by means of a rotating felt brush or by means of a flux-impregnated sponge. Both brushing and flux application operations take a few seconds. The next processing stage involves the formation of lead-based cast-on-strap joints using a suitable water-cooled preheated metallic mold. This metallic mold possesses two small cavities for each plate group loaded into the casting machine. This allows the simultaneous fabrication of a cast-on-strap joint which will join together the lugs of the positive plates in the group, and the fabrication of another cast-on-strap joint which will join together the lugs of the negative plates in the group, forming a cell element. To form the cast-on-strap joints, the mold cavities are filled with a molten strap alloy of a suitable chemical composition. This is done either by gravity or injection casting. Then, the flux-impregnated plate lugs are immersed into the molten strap alloy, and subsequently this is allowed to cool and solidify in the mold. The molten strap alloy is preheated to a suitable temperature (much higher than the mold temperature) prior to the casting operation. The shape and physical dimensions of the cast-on-strap joints depend on the commercial brand of the battery under fabrication. The final processing stage is the unloading of the cell elements from the casting machine.

At room temperature, the flux helps to reduce the lead oxides remaining after the brushing of the plate lugs. Thus, the flux application should prepare (activate) the plate lugs surface so that these can subsequently be easily wetted and covered by the molten lead-based strap alloy. This, in turn, will help to obtain a suitable interfacial adherence between the plate lugs and the cast-on-strap joints. After its application, the flux is thought to provide further protection to the plate lugs surface by forming a film which avoids any contact with oxygen from the air until the plate lugs are immersed into the molten strap alloy. Once in contact with the liquid strap alloy, and after evaporation of the solvent, the flux is thought to form a new protective film (composed by the salts contained in the flux, which have been liquefied), which covers the plate lugs surface at high temperature, protecting it also from the interaction with the atmospheric oxygen. A characteristic feature of the cell elements produced by the conventional cast-on-strap process just described, is the presence of a substantial amount of porosity mainly located at the interface between the plate lugs surface and the cast-on-strap joints, and which is easily visible in cross or longitudinal sections of the latter pieces. This results in an accelerated corrosion at the pores, which might lead to battery explosions. This kind of manufacturing defect is universally present in modem automotive lead-acid batteries, regardless of the commercial brand. It is well known that poor lug/strap joints are one of the major manufacturing defects causing battery failure. Thus, as a result of tougher quality standards being introduced by the car manufacturers all over the world, the need for the development of a process able to produce pore-free cast-on-strap joints, has become mandatory.

Over the last few years, some attempts have been made in order to find a solution for the porosity formation in the cast-on-strap joints. For instance, Cook et al, in the Battery Man, investigated the effect of casting parameters such as strap mold and metal temperatures, lug immersion speed and the time between strap mold filling and lug entry into the molten strap alloy, on the quality of cast-on-strap joints, using different lead-based lug and strap alloys. These researchers found the penetration depth of the lug into the molten strap alloy, the lug thickness and the strap mold temperature, to be critical factors. Another important finding was that a lead-tin alloy employed by them was not suitable as a strap alloy for the alloy combinations and joining conditions investigated. However, these researchers could not develop a process truly able to produce pore-free cast-on-strap joints. In order to determine the causes of the formation of porosity in the cast-on-strap extensive research program was carried out. The research led to the development of the present invention. joints obtained by employing the conventional cast-on-strap process. The effect of several parameters on the quality of Cast-On-Strap joints was studied. The parameters considered were: strap mold and metal temperatures, chemical composition of the lug and strap alloys, type of flux (including tests without the use of any flux), flux drying on the plate lugs surface (natural drying or drying by using a cold or a hot air blasting at several flows and pressures), plate lugs preheating, form of flux application (with or without flux preheating, and with or without the simultaneous application of ultrasonic vibration), duration of the flux application, method of cleaning up the plate lugs surface (without cleaning up, brushed lugs, and brushed lugs with surface subsequently mechanically stripped), elimination of the products left by the chemical reaction taking place at room temperature between the flux and the contaminants found on the plate lugs surface (by rubbing with paper towels, by using a cold air blasting at several flows and pressures, or by water rinsing, with or without water preheating, and with or without the simultaneous application of ultrasonic vibration), duration of the water rinsing, and employment of different cast-on-strap joint types.

The following causes of porosity formation in the cast-on-strap joints obtained by employing the conventional cast-on-strap process were identified: presence of residual dirt on the plate lugs surface (mainly lead oxide skins, active material paste, grease and oil); presence of humidity on the plate lugs surface, and presence of flux as well as presence of the products left by the chemical reaction taking place at room temperature between the flux and the contaminants found on the plate lugs surface.

The independent action of each one of these factors was found to be a sufficient cause for the formation of porosity in the cast-on-strap joints. However, it was observed that several of these factors act together during the conventional cast-on-strap process. For instance, the conventional plate lug brushing is carried out in a direction parallel to the plate lugs surface, which greatly reduces the efficiency of the operation, resulting in the presence of a substantial amount of dirt remaining on the plate lugs surface after the brushing. Additionally, the steel brush employed for the operation can easily cause a significant amount of plastic deformation at the surface of the plate lugs, which results in dirt encapsulation instead of dirt elimination. Furthermore, any grease or oil present on the surface of the plate lugs, cannot be eliminated by brushing only. Another factor found to play an important role in the formation of porosity in the cast-on-strap joints, is the way the flux is conventionally employed. The reasons for this are as follows. There is not sufficient time during the application of the flux to carry out a complete elimination of any residues of lead oxide, active material paste, as well as of any other surface contaminants left on the plate lugs surface after the brushing operation. Besides, any grease or oil present on the plate lugs surface after the brushing operation, might not be eliminated by the flux. Both the solids contained in the flux (and left on the plate lugs surface after evaporation of the solvent) and the products left by the chemical reaction taking place at room temperature between the flux and the contaminants found on the plate lugs surface, cause a significant amount of gas on heating. This has been found to be the major cause of formation of porosity in the cast-on-strap joints, especially under the fast cooling conditions existing in the metallic strap mold. A factor contributing to this, is the fact that the plate lugs are usually introduced into the molten strap alloy without any preheating. However, in the present work, preheating of the plate lugs prior to manufacturing of the cast-on-strap joints was found to be detrimental to the lugistrap joining, due to the re-oxidation of the plate lugs surface. This showed that in order to obtain good lug/strap joints, re-oxidation must be avoided, even for plate lug surfaces without any preheating, which could be done by keeping into a minimum the time elapsing between the application of the flux and the introduction of the plate lugs into the molten strap alloy. The presence of a significant amount of active material paste (which is highly porous) remaining adhered to the surface of the plate lugs after the brushing operation, will increase the amount of flux introduced later on into the molten strap alloy, with a consequent increase in the porosity originated due to this cause. The lack of adherence between plate lugs and the cast-on-strap joints was found when a flux was not employed. Thus, the flux is necessary and cannot be eliminated from the cast-on-strap process. However, in order to obtain pore-free cast-on-strap joints, the application of the flux must be optimized.

It can be concluded that pore-free cast-on-strap joints cannot be reproducibly produced by employing the conventional cast-on-strap process. In order to improve this process, the brushing and the flux application operations, carried out prior to the manufacturing of the cast-on-strap joints, must be modified. In the present invention, this has been done by using a three-step plate lugs treatment process comprising cleaning up by combined action of flux and ultrasonic vibration, water rinsing under ultrasonic vibration and dying up by gas blasting. The plate lugs surface brushing operation has been eliminated. It is an object of the present invention to provide a process for the manufacture of cast-on-strap joints which reduces porosity formation.

It is another object of the present invention to provide such a process which optimizes the application of flux.

It is a further object of the present invention to provide such a process which is easy to implement, efficient and relatively inexpensive.

These and other objects and advantages of the present invention will become apparent from a reading of the attached specification and appended claims.

SUMMARY OF THE INVENTION

The present invention is a process for the manufacture of pore-free cast-on-strap joints. The process comprises the steps of: (1) cleaning the plate lug surface by combined action of flux and ultrasonic vibration; (2) water rinsing under ultrasonic vibration; and (3) drying by gas blasting. This process eliminates the presence of lead oxides, greases, oils, active material pastes, fluxes, residual reaction products and humidity from the surface of the plate lugs. The gases that contact the liquid lead-based strap alloys are reduced or eliminated. As a result, the porosity of the cast-on-strap joints is reduced or eliminated.

DETAILED DESCRIPTION OF THE PREFERRED EMBODIMENTS

Figure 1:
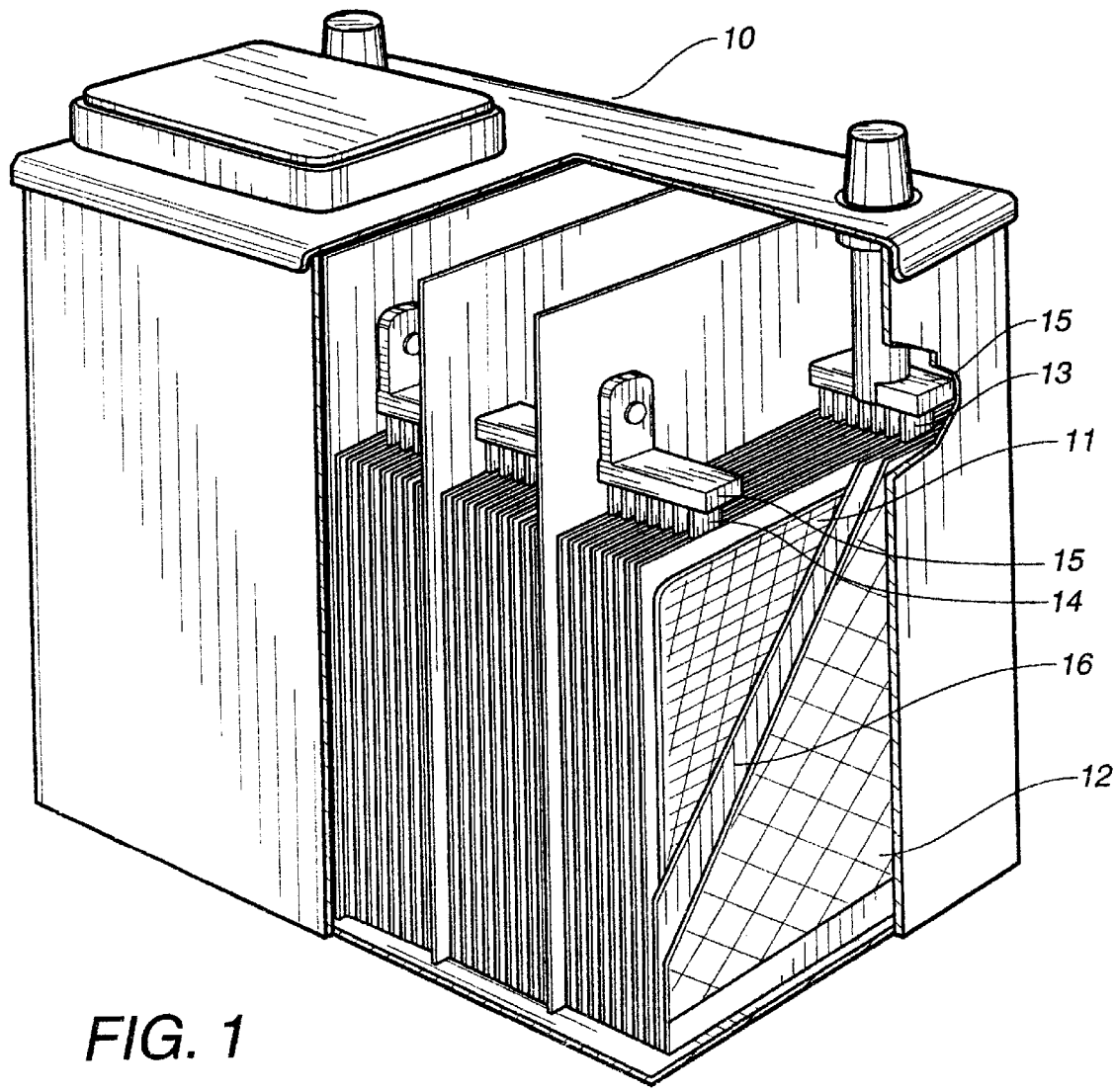
FIG. 1 is an isometric view showing the main components of an automotive lead-acid battery.

Referring to FIG. 1, the main components of a lead-acid battery utilizing the cast-on-strap joints of this invention are shown. Thus, the lead-acid battery 10 is shown which includes a container, a pair of terminal posts and a cover sealed to the container by any conventional means. The container is divided into a plurality of cells and an element group is located in each of the cells. Each element group includes a plurality of positive plates 11 and negative plates 12. These plates, as is conventional, include a supporting plate grid having an integral plate lug 13 and 14, a layer of active material attached thereto, and a cast-on-strap joint 15 joining together the plate lugs 13 and 14 of the respective positive and negative plate grids. The terminal posts are also connected through the cast-on-strap joints 15 to the plates 11 and 12. The positive plates 11 and negative plates 12 are kept apart by the envelope separators 16.

Figure 2:
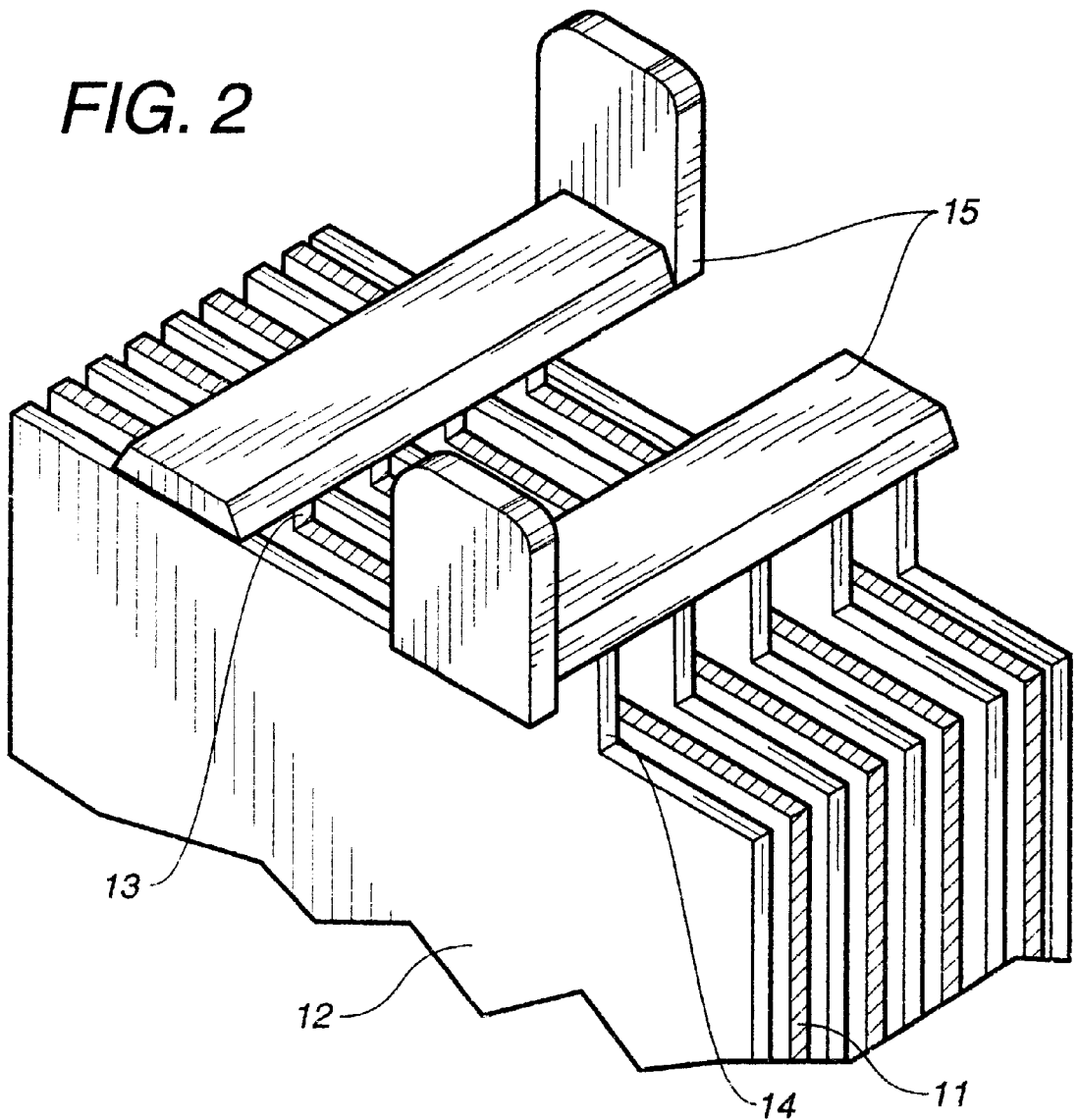
FIG. 2 shows an isometric view of a cast-on-strap joint having a plurality of positive and negative plate lugs as is referred in the present invention.

Turning now to FIG. 2, there is shown an isometric view in more detail than in FIG. 1 of the cast-on-strap joints 15 joining together a plurality of negative plate lugs 13 and a plurality of positive plate lugs 14 of an element group. The particular chemical composition and dimensions of plate lugs and cast-on-strap joints shown in FIG. 1 and 2 may be varied as desired for the intended application.

Figure 3:
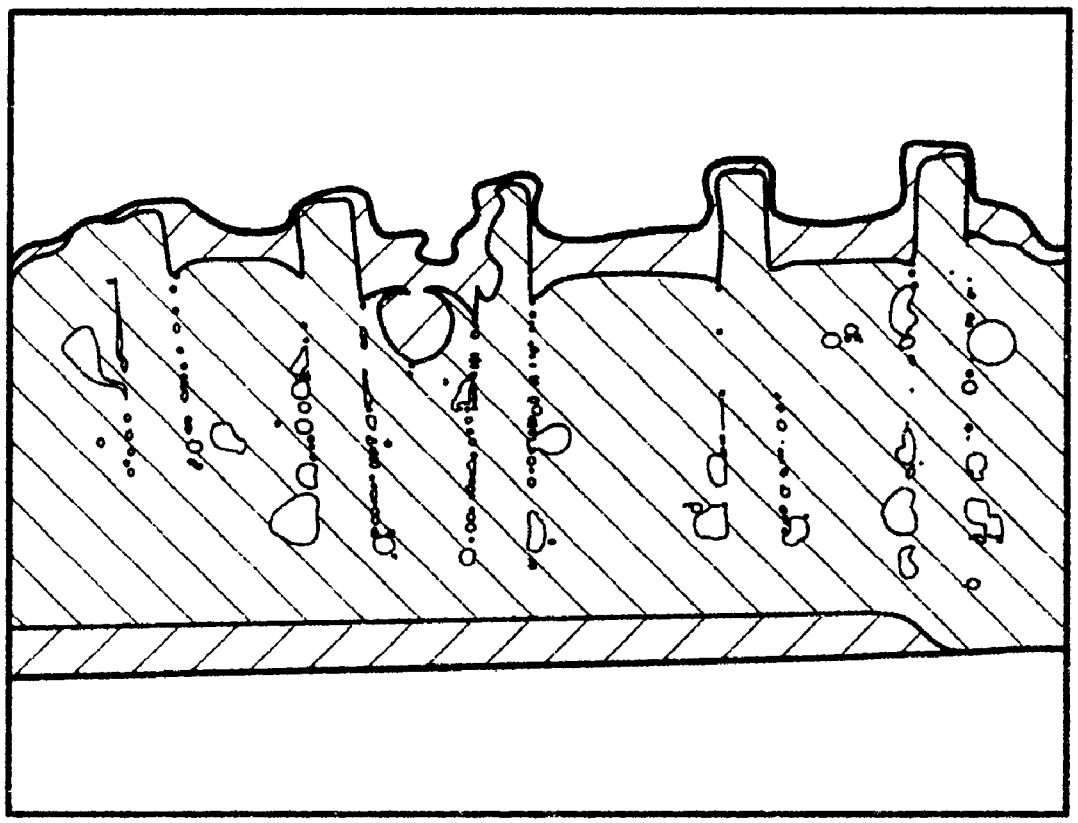
FIG. 3 is a photomicrograph at a magnification of 3.5× showing a cross section of a Cast-On-Strap joint manufactured according to the previously used cast-on-strap process.
Figure 4:
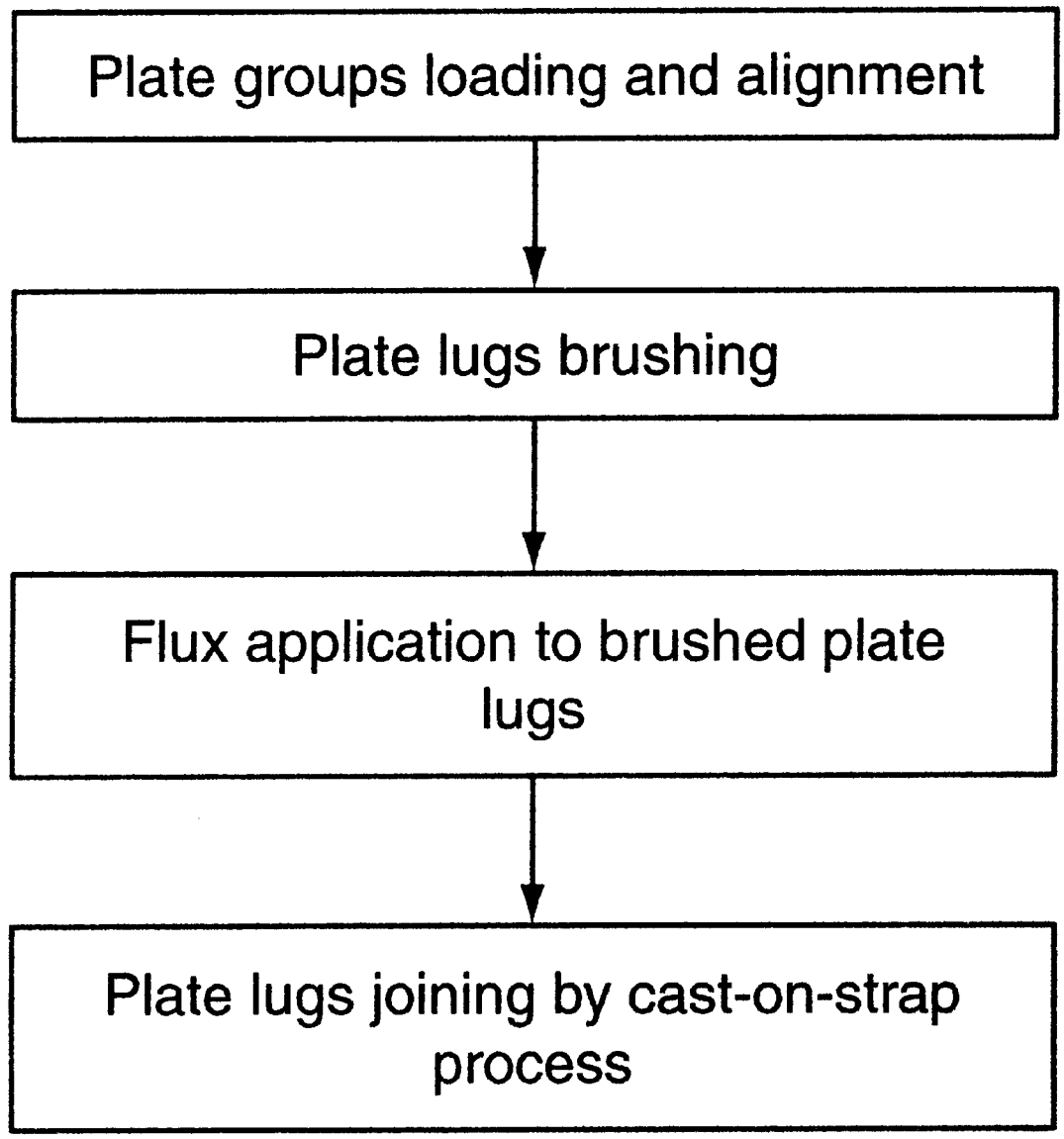
FIG. 4 is a flow diagram showing the steps of the previously used cast-on-strap process.

As it has been described in the background of the invention, the previous method used to manufacture cast-on-strap joints results in pieces with high porosity as shown in the photomicrograph of FIG. 3. The previous method used to manufacture cast-on-strap joints, as shown in FIG. 4, comprise the steps of assembling and alignment of groups of a plurality of negative and positive plates, plate lugs brushing, flux application to brushed plate lugs, and finally, plate lugs joining by the cast-on-strap process consisting in the introduction of the plate lugs into a suitable molten lead-based strap alloy contained in a suitable strap mold. The cast-on-strap joints are formed by subsequent solidification of the molten strap alloy in the strap mold.

It was found by microscopic observations that the plate lugs surface generally have micropores filled with oil, active materials and other residues remaining from previous plate lugs processing. The residues are partially covered by lead scratching during the plate lugs brushing step referred in FIG. 4. On the other hand, the brushing operation parallel to the plate lugs is an inefficient method to completely remove the residues. After the previous plate lugs brushing operation, using the process indicated in FIG. 4, flux is applied to the brushed plate lugs in order to reduce the lead oxides. However, by industrial observations and experimental research, it was found that generally during the subsequent cast-on-strap process, as indicated in FIG. 4, residues of lead oxides, grease, oil, active material paste, flux, residual reaction products and humidity, are still present on the plate lugs surface.

From further experiments where different parameters like chemical composition and thickness of plate lugs, temperature of lead-based strap alloys, and different cast-on-strap joint types were tested, it was found that the main mode to avoid the formation of pores in the cast-on-strap joints was to eliminate the residues of lead oxides, grease, oil, active material paste, flux, residual reaction products and humidity, as described by the present invention.

Figure 5:
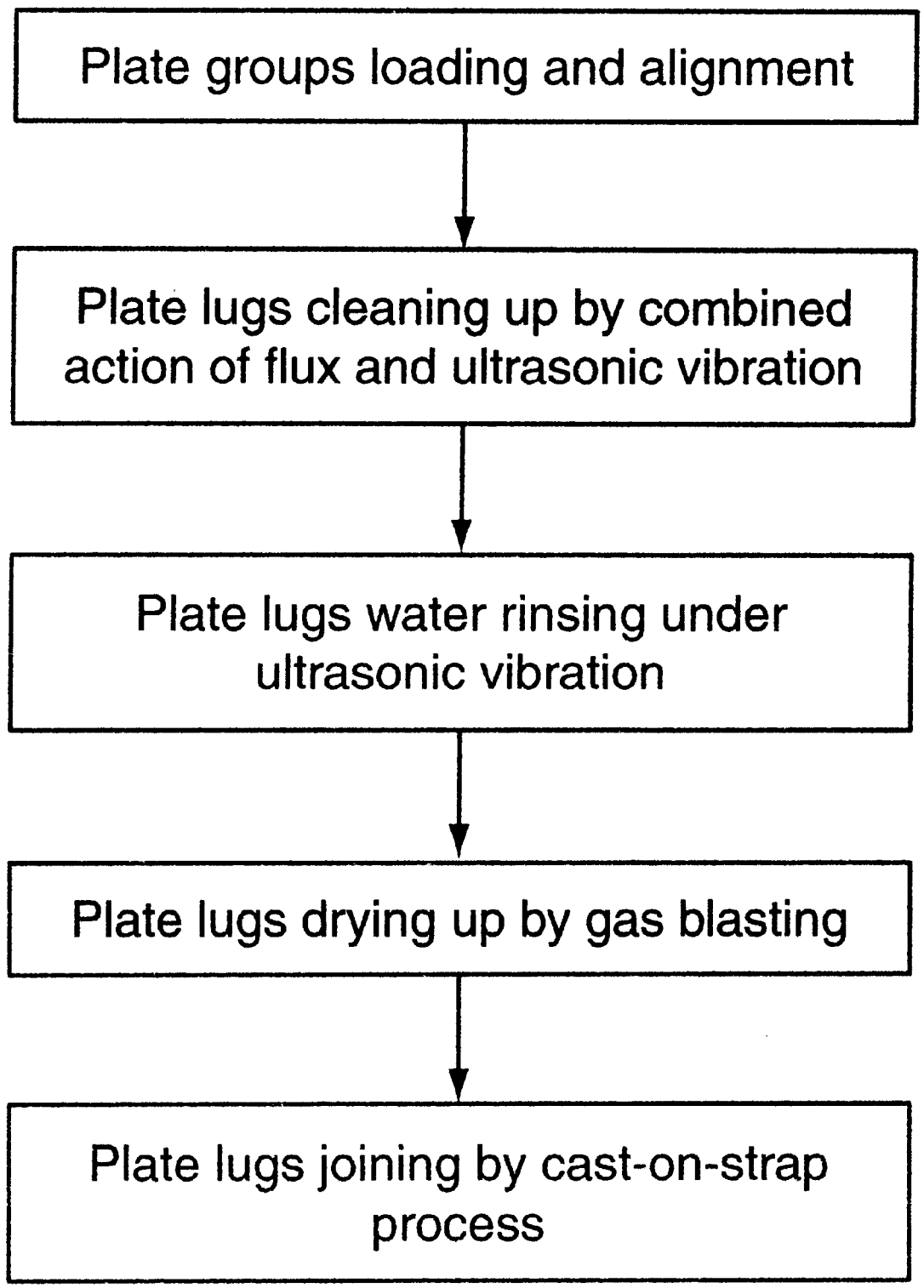
FIG. 5 is a flow diagram showing the process steps required to obtain pore-free cast-on-strap joints according to the present invention.

To this end, the method of the present invention, as shown in FIG. 5, comprises the following steps.

Once the groups of a plurality of negative and positive plates already charged with the active material have been assembled and aligned, the lugs of the plates are cleaned up by combined action of flux and ultrasonic vibration. The objective of this step is to completely eliminate any grease, oil, active material paste, flux, and residual reaction products, and to reduce the lead oxides, from the plate lugs surface. With this step, even the micropores at the plate lugs surface are cleaned up. Depending on the flux employed, this step can be carried out at different temperatures, for different periods of time, at different ultrasonic frequencies, and at a different ultrasonic power. As an illustrative example, the application of an alkaline flux at 65° C., employing a frequency of 20 to 40 Khz., and an ultrasonic power of 200 to 500 watts, during 10 to 20 seconds, will result in desirable cleaning conditions for the plate lugs of six plate groups of a plurality of positive and negative plates.

In accordance with the present invention, the second step of the process comprises plate lugs water rinsing under ultrasonic vibration. The objective of this step is to eliminate the residues of flux and reaction products, even from the micropores in the plate lugs surface. Depending on the rinsing time required, different ultrasonic frequencies, different ultrasonic powers, and different processing times, can be used. As an illustrative example, employing ultrasonic frequencies from 20 to 40 Khz at ultrasonic powers from 200 to 500 Watts, during 10 to 20 seconds, will result in desirable rinsing conditions for the plate lugs of six to twelve plate groups of a plurality of positive and negative plates.

The third step of the process, according to the present invention, comprises the plate lugs drying up by gas blasting to avoid the reoxidation of the plate lugs surface prior to the formation of the cast-on-strap joints by the cast-on-strap process. This step must be carried out in the shortest period of time, using oil-free free dry gases at high pressures. As an illustrative example, blasting the plate lugs with oil-free dry air, at pressures higher than 80 psi, during at least five seconds, will result in desirable drying conditions for the plate lugs of six to twelve plate groups of a plurality of positive and negative plates.

Figure 6:
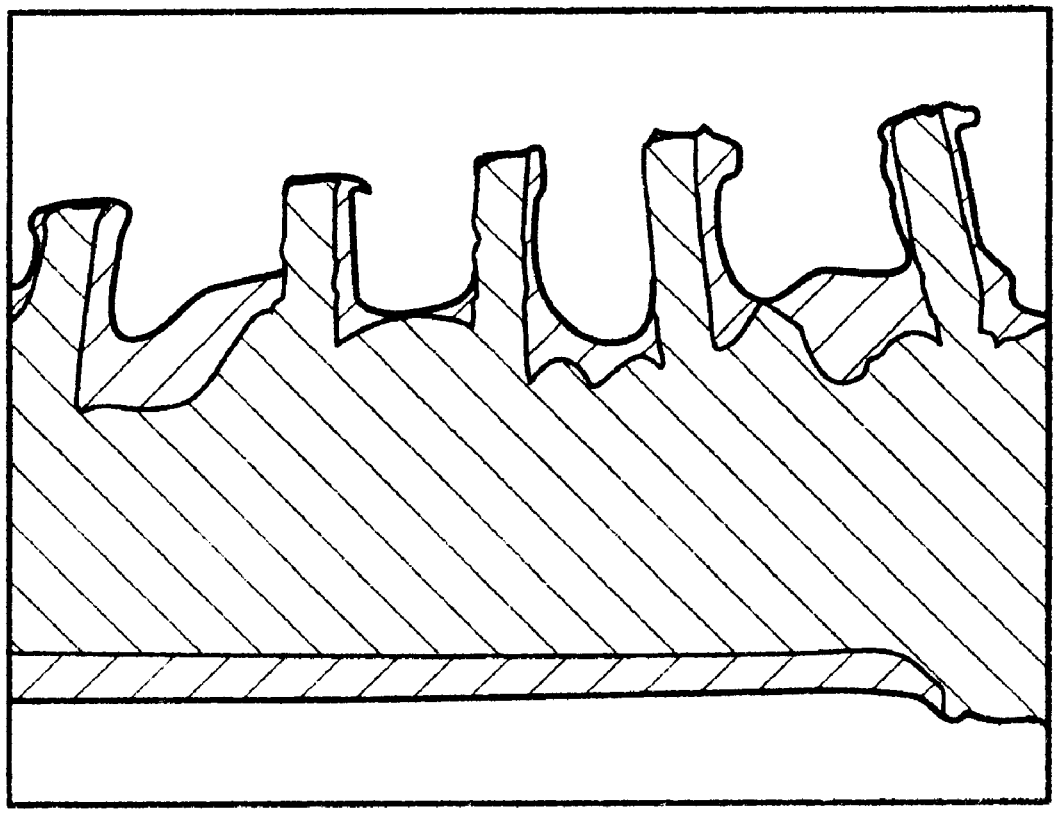
FIG. 6 is a photomicrograph comparable to FIG. 3 but showing a cross section of a cast-on-strap joint obtained according to the present invention.

After the plate lugs drying up process according to the present invention, the plate lugs of a plurality of positive and negative plates are introduced into a suitable molten lead-based strap alloy contained in a suitable strap mold. The cast-on-strap joints are formed by subsequent solidification of the molten strap alloy in the strap mold. The photomicrograph of FIG. 6 shows a cross section, at a magnification of 3.5×, of a cast-on-strap joint obtained according to the present invention.

Thus, as has been seen, the present invention allows the manufacturing of pore-free cast-on-strap joints to be used in lead-acid batteries. The foregoing disclosure and description of the invention is illustrative and explanatory thereof. Various changes in the details of the present method can be made within the scope of the appended claims without departing from the true spirit of the invention. The present invention should only be limited by the following claims and their legal equivalents.

We claim:

1. A method for producing pore-free cast-on-strap joints for lead-acid batteries, the method comprising the steps of:

cleaning a plurality of positive and negative plate lugs belonging to assembled and aligned plate groups by combined action of flux and ultrasonic vibration;

water rinsing the plate lugs under ultrasonic vibration; and drying the plate lugs by gas blasting prior to the formation of the cast-on-strap joints.

2. The method of claim 1, further comprising the step of:

forming the cast-on-strap joint.

3. The method of claim 2, further comprising the step of:

introducing the plate lugs into a molten lead-based strap alloy contained in a strap mold; and solidifying the molten strap alloy in the strap mold.

* * * * *